United States Patent
Dutton et al.

(10) Patent No.: US 12,130,384 B2
(45) Date of Patent: Oct. 29, 2024

(54) MULTIPLE FIELD-OF-VIEW (FOV) OPTICAL SENSOR USING A MICRO-ELECTRO-MECHANICAL SYSTEM (MEMS) MICRO- MIRROR ARRAY (MMA)

(71) Applicant: Raytheon Company, Tewksbury, MA (US)

(72) Inventors: Andrew W. Dutton, Tucson, AZ (US); Gerald P. Uyeno, Tucson, AZ (US); Sean D. Keller, Tucson, AZ (US); Eric Rogala, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 794 days.

(21) Appl. No.: 17/217,929

(22) Filed: Mar. 30, 2021

(65) Prior Publication Data
US 2022/0317260 A1  Oct. 6, 2022

(51) Int. Cl.
*G01C 3/08* (2006.01)
*G01S 7/481* (2006.01)
(Continued)

(52) U.S. Cl.
CPC .......... *G01S 7/4817* (2013.01); *G01S 17/89* (2013.01); *G02B 26/0833* (2013.01)

(58) Field of Classification Search
CPC .... G01S 7/4817; G01S 17/89; G02B 26/0833
See application file for complete search history.

(56) References Cited

U.S. PATENT DOCUMENTS 5,404,375 A   4/1995   Kroeger et al.
5,854,702 A   12/1998  Ishikawa et al.
(Continued)

FOREIGN PATENT DOCUMENTS

DE   102006031114 A1 * 1/2008 .......... G01S 7/4817
DE   102011104023.8 B4   7/2019
(Continued)

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.
(Continued)

*Primary Examiner* — Mark Hellner
(74) *Attorney, Agent, or Firm* — Schwegman Lundberg & Woessner, P.A.

(57) ABSTRACT

A multiple FOV optical sensor includes a primary mirror having first and second rings of differing curvature to collect light from an object within different FOV. A secondary mirror includes a MEMS MMA in which the mirrors tip and tilt in 2 DOF or add piston in 3 DOF to (I) reflect light from the first ring within the first FOV that is focused at an imaging plane coincident with an imaging detector to form a focused image of the object at the imaging detector or (II) reflect light from the second ring within the second FOV onto the imaging detector (either focused to form a focused image or defocused to form a blurred spot). The MEMS MMA may be configured to alternate between (I) and (II) or to perform both (I) and (II) at the same time with the different FOV either overlapped or spatially separated on the detector. The sensor may be configured as an all-passive sensor, a dual-mode sensor or a hybrid of the two.

20 Claims, 10 Drawing Sheets

(51) Int. Cl.
    *G01S 17/89*     (2020.01)
    *G02B 26/08*     (2006.01)

(56) References Cited

U.S. PATENT DOCUMENTS

| | | | |
|---|---|---|---|
| 6,181,450 B1 | 1/2001 | Dishman et al. | |
| 6,271,953 B1 | 8/2001 | Dishman et al. | |
| 6,327,063 B1 | 12/2001 | Rockwell | |
| 6,567,574 B1 | 5/2003 | Ma et al. | |
| 6,792,028 B2 | 9/2004 | Cook et al. | |
| 7,049,597 B2* | 5/2006 | Bodkin | G01J 5/06 250/353 |
| 7,304,296 B2 | 12/2007 | Mills et al. | |
| 7,593,641 B2 | 9/2009 | Tegge, Jr. | |
| 7,626,152 B2 | 12/2009 | King et al. | |
| 7,660,235 B2 | 2/2010 | Alicherry et al. | |
| 7,667,190 B2 | 2/2010 | Mills et al. | |
| 7,969,558 B2 | 6/2011 | Hall | |
| 8,164,037 B2 | 4/2012 | Jenkins et al. | |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,368,889 B2 | 2/2013 | Schwiegerling et al. | |
| 8,380,025 B2 | 2/2013 | Anderson et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,983,293 B2 | 3/2015 | Frankel et al. | |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 | 2/2018 | Uyeno et al. | |
| 9,927,515 B2 | 3/2018 | Keller et al. | |
| 10,148,056 B2 | 12/2018 | Uyeno et al. | |
| 10,209,439 B2 | 2/2019 | Keller et al. | |
| 10,243,654 B1 | 3/2019 | Uyeno et al. | |
| 10,267,915 B2 | 4/2019 | Uyeno et al. | |
| 10,381,701 B2 | 8/2019 | Motoi | |
| 10,444,492 B2 | 10/2019 | Hopkins et al. | |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 11,333,879 B2 | 5/2022 | Uyeno et al. | |
| 2002/0141689 A1 | 10/2002 | Qian et al. | |
| 2002/0196506 A1 | 12/2002 | Graves et al. | |
| 2003/0062468 A1 | 4/2003 | Byren et al. | |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2012/0168605 A1 | 7/2012 | Milanovic | |
| 2012/0170024 A1* | 7/2012 | Azzazy | G01J 3/06 356/402 |
| 2013/0271818 A1 | 10/2013 | Bastien et al. | |
| 2014/0063299 A1 | 3/2014 | Fest et al. | |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0234703 A1 | 8/2016 | Aldana et al. | |
| 2016/0294472 A1 | 10/2016 | Palmer et al. | |
| 2017/0293137 A1 | 10/2017 | Zhao et al. | |
| 2018/0231715 A1 | 8/2018 | Bishop et al. | |
| 2019/0066320 A1 | 2/2019 | Uyeno et al. | |
| 2019/0154921 A1 | 5/2019 | Xing et al. | |
| 2020/0005097 A1* | 1/2020 | Sinclair | G01S 13/931 |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |

FOREIGN PATENT DOCUMENTS

| | | |
|---|---|---|
| EP | 2667142 A1 | 11/2013 |
| EP | 2533003 B1 | 8/2018 |
| WO | WO-2014200581 A2 | 12/2014 |

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

King, D F, et al., "3rd-Generation 1280 x 720 FPA development status at Raytheon Vision Systems", Proc. of SPIE vol. 6206 62060W-1, (2006), 16 pgs.

"U.S. Appl. No. 17/007,917, Notice of Allowance mailed Jan. 10, 2022", 14 pgs.

"U.S. Appl. No. 17/007,917, Supplemental Notice of Allowability mailed Apr. 19, 2022", 2 pgs.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Response filed Dec. 1, 2021 to Non Final Office Action mailed Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

(56) References Cited

OTHER PUBLICATIONS

Kim, et al., "Demonstration of large-angle nonmechanical laser beam steering based on LC polymer polarization grating", Proc. of SPIE vol. 8052 80520T, (May 13, 2011), 13 pgs.

Kim, Jihwan, et al., "Wide-angle, nonmechanical beam steering using thin liquid crystal polarization gratings", Proc. of SPIE, vol. 7093, (2008), 12 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

\* cited by examiner

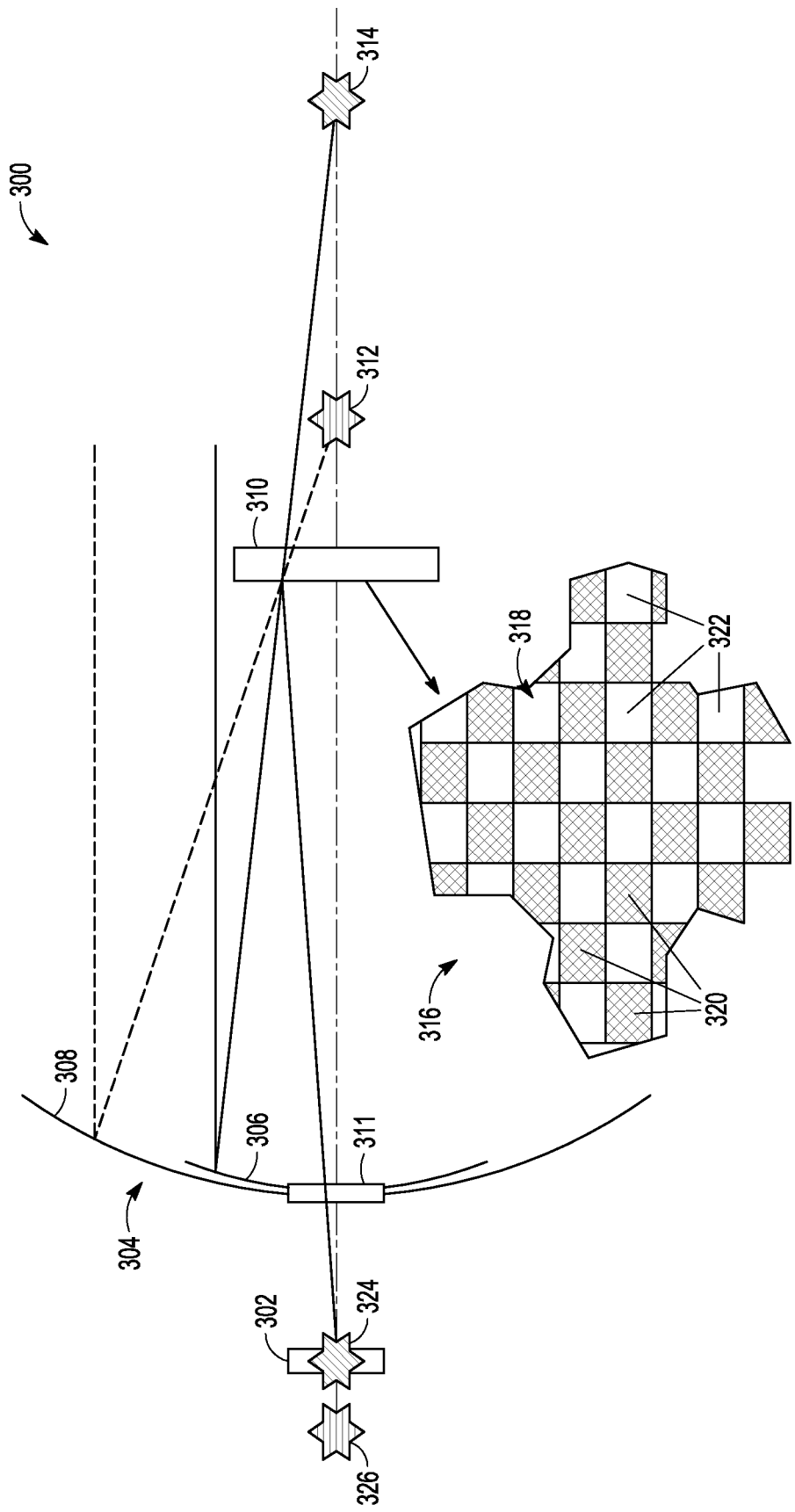

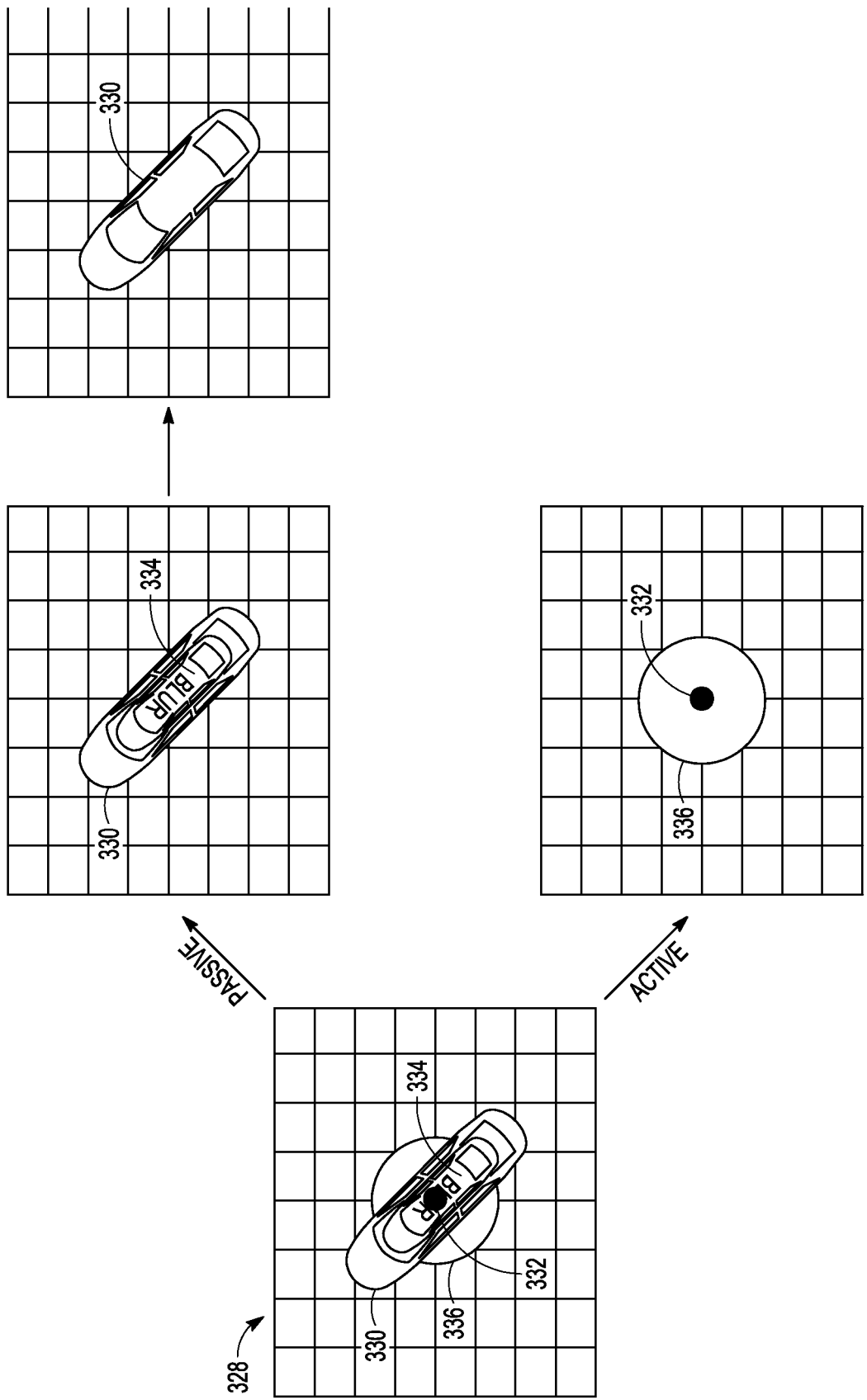

MULTIPLE FIELD-OF-VIEW (FOV) OPTICAL SENSOR USING A MICRO-ELECTRO-MECHANICAL SYSTEM (MEMS) MICRO- MIRROR ARRAY (MMA)

BACKGROUND OF THE INVENTION

Field of the Invention

This invention relates to passive imaging or dual-mode optical sensors, and more particularly to the use of a MEMS MMA to such sensors with multiple field-of-view (FOV) without having to translate any of the optical components.

Description of the Related Art

A passive imaging system includes an optical system to collect light within a FOV of scene and focus the light to produce an image on a detector such as a focal plane array (FPA). To provide an adjustable FOV, the optical system may include an afocal zoom system in which the magnification M and the FOV can be varied without altering the converence or divergence of the beam of light. A focusing lens focuses the beam to produce the image on the detector.

An afocal zoom system includes two positive (converging) lenses of equal focal length (L1 and L3) with a negative (diverging) lens (L2) between them with an absolute focal length less than half of the positive lenses. L3 is fixed but L1 and L2 can move axially in a non-linear relationship. This movement is usually performed by a complex arrangement of gears and cams in the lens housing, although some modern zoom lenses use computer-controlled servos to perform this positioning.

Dual-Mode systems may include a passive imaging system to detect, for example, infrared (IR) emissions from targets in a scene and a semi-active laser (SAL) system to detect SAL energy scattered from the targets in the scene. The passive imaging system collects light within a FOV and forms an image of the targets on a detector such as an FPA. The SAL system typically includes a non-imaging system that forms an extended spot e.g. a blurred image of the reflected light off the target onto a position sensitive detector e.g., a quad-detector. This detector produces a guidance signal based upon the position of the spot.

U.S. Pat. No. 8,164,037 entitled "Co-Boresighted Dual-Mode SAL/IR Seeker Including a SAL Spreader" includes a primary mirror for collecting light (passive emissions or laser energy) and a secondary mirror that reflects passive emissions to an IR FPA to capture images of a target and transmits the laser energy to a positionally-sensitive SAL detector that converts the spatial displacement of a spot to a target bearing. A SAL spreader is position between the secondary mirror and the SAL detector to blur the laser energy to form the spot on the SAL detector. Both the IR FPA and SAL detector share a common and fixed FOV.

EP Patent Application EP 2667142A1 entitled "Dual-Mode SAL/IR Imaging" includes a FPA and an objective optical assembly providing a common optical path to the FPA for incident laser radiation of a first wavelength band and incident ambient radiation of a second wavelength band non-overlapping with the first band. A first optical filter is operable to selectively pass the incident laser radiation to the FPA in a transmissive mode and selectively block the incident laser radiation from the FPA in a non-transmissive mode and a second optical filter is operable to selective pass the incident ambient radiation to the FPA in a transmissive mode and selectively block the incident ambient radiation from the FPA in a non-transmissive mode. Both modes share a common and fixed FOV.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a multiple FOV optical sensor in which a primary mirror has first and second rings of differing curvature to collect light from an object within different FOV. A secondary mirror includes a Micro-Electro-Mechanical System (MEMS) MEMS Micro-Mirror Array (MMA) in which the mirrors tip and tilt in two degrees of freedom (2 DOF) to (I) reflect light from the first ring within a first FOV that is focused at an imaging plane coincident with an imaging detector to form a focused image of the object at the imaging detector or (II) reflect light from the second ring within a second FOV onto the imaging detector (either focused to form a focused image or defocused to form a blurred spot). The MEMS MMA may be configured to piston the mirrors to provide actuation in 3 DOF. The MEMS MMA may be configured to alternate between (I) and (II) or to perform both (I) and (II) at the same time with the different FOV either overlapped or spatially separated on the detector.

In different embodiments, the first and second rings may correspond to inner and outer rings. The inner and outer rings may have respective curvatures that correspond to relatively narrow and wide FOV or relatively wide and narrow FOV.

In an embodiment, the sensor is a passive imaging sensor in which the MEMS MMA is configured to collect light from the first and second rings and adjust the focus for each such the sensor provides focused passive images at two different FOV. The MEMS MMA may be configured to tip and tilt the mirrors to move the focus to the imaging plane, which results in a loss of phase coherence but still permits image formation on the detector. Alternately, the MEMS MMA may be configured to add piston, which can be used to further adjust the optical path length along each ray at the center of each mirror to preserve phase coherence at the focus.

In an embodiment, the sensor is a dual-mode imaging sensor in which passive light is collected from the first ring and imaged onto the detector and active light (light reflected from the object) is collected from the second ring and blurred at the detector such as in a semi-active laser (SAL) system. If the primary mirror is configured such that the FOV for the first ring is focused at the detector, the different FOV for the second ring is inherently focused at an imaging plane offset from the detector thus blurring the active light (absent correction taken by the MEMS MMA). The mirrors may be tipped/tilted and possibly pistoned to further adjust the focus to provide the desired amount of blur. In different embodiments, the imaging detector may comprise a broadband detector that is sensitive to light that spans both the passive and active bands or a dual-band detector that is sensitive to and reads out the passive and active bands independently.

In a hybrid embodiment, the MEMS MMA is controlled to provide both dual-mode sensing and passive sensing in multiple FOV. For example, a scenario may have the first and second rings providing narrow and wide FOV. The wide FOV could be used initially to detect an object (e.g., via a semi-active arrangement where the received active signal is blurred on the detector to provide directional information) and initiate track. The sensor could then switch to the narrow FOV to passively image the object to track and observe the object. As the object gets close, to avoid overfilling the detector, the sensor could switch to the wide FOV and adjust the focus to passively image the object through terminal engagement.

In an embodiment, the sensor is configured to select one ring at the time, either switching from the first to the second FOV or vice-versa during an engagement or possibly switching back-and-forth such as between passive and active modes. Light from the unused ring is directed off of (away from) the detector and treated as stray light.

In another embodiment, the sensor is configured to simultaneously partition the mirrors into two segments such that light from both the first and second FOV overlap spatially at the imaging detector. The two segments may be contiguous such as inner and outer rings of mirrors or non-contiguous such as interspersed mirrors as in a checkerboard pattern. In a dual-mode configuration with a broadband detector, the sensor tracks the time gates on the SAL to select passive and active frames. With a dual-band detector, the sensor selects either the passive or active band. In either case, the passive frame is processed to identify and extract the focused image of the object and the SAL frame is processed to extract a location of the object. Visibility may be maintained for both the passive imaging and SAL in different FOV without interruption. In an all-passive configuration, the MEMS MMA could be configured to alternate between focusing the image in the first and second FOV.

In another configuration, the sensor is configured to simultaneously partition the mirrors into two segments, either contiguous or non-contiguous, to reflect the light from the first and second rings of the primary mirror to different portions of the imaging detector such that each read out image includes both the first and second FOV in the different non-overlapping portions of the image, respectively. In a dual-band sensor, the MEMS MMA is configured to form a focused portion and a blurred portion side-by-side. A broadband detector may read out the focused image and the blurred spot using the SAL time gates. A dual-band detector may simply read out the passive and active bands. Visibility may be maintained for both the passive imaging and SAL in different FOV without interruption. In an all-passive sensor, the MEMS MMA is configured to simultaneously form a focused image of the object in the different FOV side-by-side on the detector.

In an embodiment in which the MEMS MMA has 3 DOF the piston may also be used to provide other beam shaping functions such as wavefront correction for atmospheric distortion or optical path length differences.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is an illustration of an embodiment of a dual-mode sensor in which the MEMS MMA is configured to overlap the first and second FOV on the imaging detector;

FIG. 5 is an illustration of an embodiment for using a dual-band detector to process the overlapped FOV to extract a focused image of an object and a location of the object;

DETAILED DESCRIPTION OF THE INVENTION

The present invention provides a multiple FOV sensor that includes a primary mirror having first and second rings of differing curvature to collect light from an object within different FOV. A secondary mirror includes a MEMS MMA in which the mirrors tip and tilt in 2 DOF or add piston in 3 DOF to (I) reflect light from the first ring within a first FOV that is focused at an imaging plane coincident with an imaging detector to form a focused image of the object at the imaging detector or (II) reflect light from the second ring within a second FOV onto the imaging detector (either focused to form an image or defocused to form a blurred spot). The MEMS MMA may be configured to alternate between (I) and (II) or to perform both (I) and (II) at the same time with the different FOV either overlapped or spatially separated on the detector. The sensor may be configured as an all-passive sensor, a dual-mode sensor or a hybrid of the two.

Without loss of generality, the multiple FOV optical sensor will be described in context of a Cassegrain telescope configuration in which primary and secondary mirrors are nominally positioned to collect light from a scene within a field-of-view (FOV) and focus the light at an image plane. If the image plane is coincident with the detector, a focused image is formed thereon. If the image plane is offset from the detector, a blurred spot is formed thereon. There are many other optical configurations that collect and focus optical radiation to an image plane, this is merely one example in which multiple FOV can be obtained with positionally-fixed optical components. As used herein, light includes any optical band including but not limited to infrared (IR) light from an object and active light such as from a laser in a SAL system. Particular bands of interest lie between about 780 nm and 1 mm with typical SAL designators at 1.06 micrometers near one end of the IR band. Without loss of generality, the invention will be described in context where the first and second rings and first and second FOV correspond to inner and outer rings of the primary mirror and narrow and wide FOV, respectively. Furthermore, the invention is described in the context of just two rings, an inner ring and an outer ring but could be extended to more than two rings.

Figure 1:
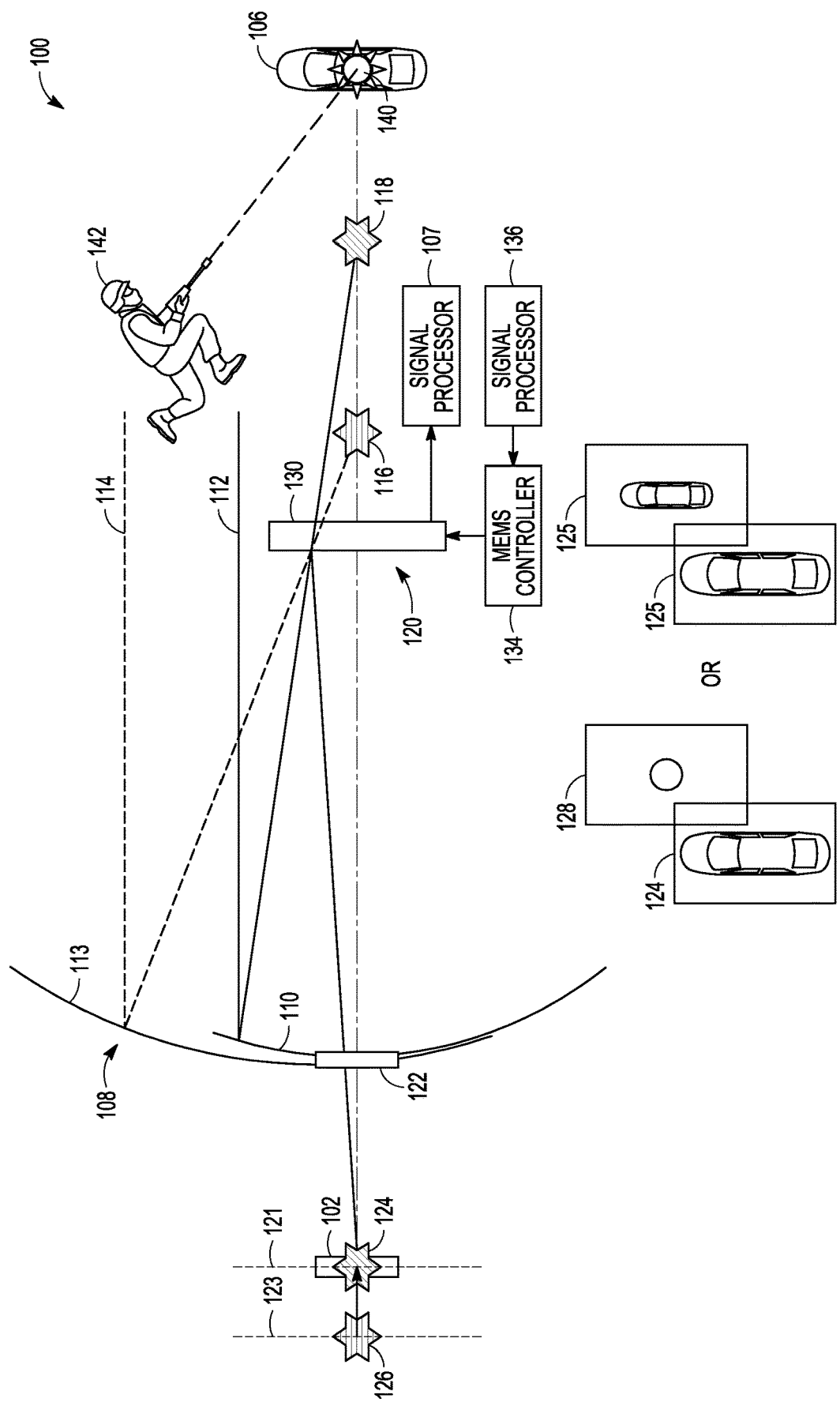
FIG. 1 is a diagram of an embodiment of a multiple FOV optical sensor in which a MEMS MMA selectively directs light from first and second rings of different curvature, hence different FOV, from a primary mirror onto an imaging detector.
Figure 2A:
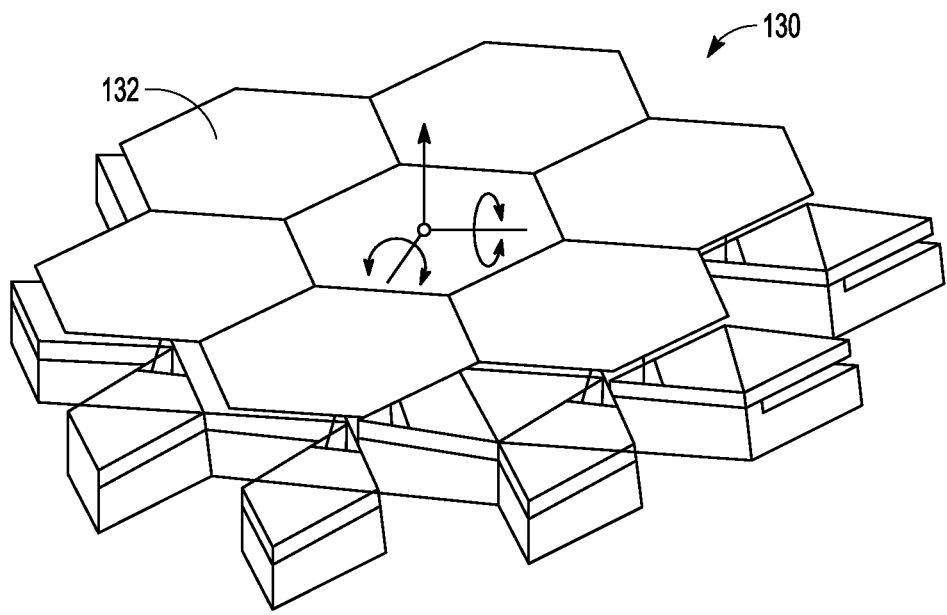
FIGS. 2A-2B are illustrations of a known embodiment of a Tip/Tilt/Piston ("TTP") MEMS MMA and a single mirror actuated to tip, tilt and piston.
Figure 2B:
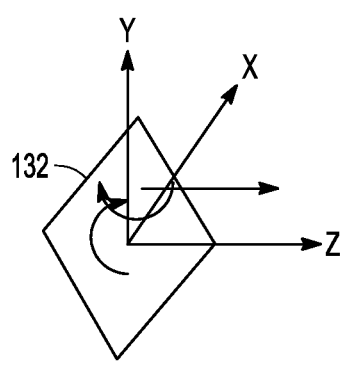

Referring now to FIGS. 1 and 2A-2B, a multiple FOV optical sensor 100 includes an imaging detector 102 configured to sense light and readout an image of an object 106 within a scene. The imaging detector may, for example, include a focal plane array (FPA) and a Read Out Integrated Circuit (ROIC) mounted on the back of the FPA. The image is suitably forwarded to a signal processor 107. The image may for example represent a focused image of the object, typically done with passive light, which can be processed to, for example detect, classify or identify the object or select an aimpoint on the object. Alternately, the image may represent a blurred-spot of the object, typically done with reflected active light such as from a SAL designator. Signal processor 107 may, for example, process image to form quadrants by summing the pixel values in quadrants of the detector to emulate a quadrant detector to locate the blurred-spot and object and provide a guidance signal to, for example, maintain the object at the center of the quadrant detector.

A primary mirror 108 includes an inner ring 110 having a curvature configured to collect light from the object 106 within a narrow FOV 112 and an outer ring 113 having a different curvature configured to collect light from the object within a wide FOV 114. The curvature of the outer ring is flattened with respect to the curvature of the inner ring to provide the wider FOV placing the primary outer ring focus 116 closer to the primary mirror than the primary inner ring focus 118.

A secondary mirror 120 is positioned on-axis in front of primary mirror 108 to reflect light through an opening 122 in primary mirror 108 onto the imaging detector 102 positioned behind primary mirror 108. In this configuration, the secondary mirror 120 forms a central obscuration for the telescope and optical sensor. The secondary mirror 120 suitably (I) reflects light from inner ring 110 within narrow FOV 112 that is focused to an image plane 121 at a secondary inner ring focus 124 coincident with the imaging detector to form a focused image 125 of the object and (I) reflects light from outer ring 113 within wide FOV 114 that is focused to an image plane 123 at a secondary outer ring focus 126 that is offset from the imaging detector to form a blurred spot 128 of the object. Moving the secondary inner or outer ring focus, moves the image plane relative to the detector. If the focus and image plane are coincident with the detector the image is focused, and if the focus and image plane are offset from the detector the image is blurred forming a blurred spot on the detector.

Secondary mirror 120 comprises one or more Micro-Electro-Mechanical System (MEMS) Micro-Mirror Array (MMAs) 130 including a plurality of mirrors 132 that are responsive to command signals provided by a MEMS controller 134 to tip and tilt the mirrors in 2 DOF (pivoting about Y and X axes, respectively) or tip, tilt and piston (translate along the Z axis) the mirrors in 3 DOF. As described below, the one or more MEMS MMAs 130 may be configured to alternate between (I) and (II) or to perform both (I) and (II) at the same time with the narrow and wide FOV either overlapped or spatially separated on the imaging detector to optically sense the object within the narrow and wide FOV. One or more sensor processors 136 are configured to provide command signals to the MEMS controller 134 that direct the controller how to configure the multiple FOV optical sensor.

In an embodiment, the MEMS MMA 130 is preferably capable of tipping and tilting over range of at least $-15°\times+15°$ to steer over a range of $+/-30°\times30°$ and pistoning (translating) over a range of at least $+/-15$ microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

One such MEMS MMA as illustrated in FIGS. 2A-2B is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

In an embodiment, the sensor 100 is an all-passive imaging sensor in which the MEMS MMA 130 is configured to collect light from the inner and outer rings and adjust the inner and outer ring focus 124 and 126 onto the detector such the sensor provides focused passive images 125 at two different FOV. This may be accomplished by tipping and tilting the mirrors to move the focus to the imaging plane, which results in a loss of phase coherence but still permits image formation on the detector. Alternately, the MEMS MMA may be configured to add piston, which can be used to further adjust the optical path length along each ray at the center of each mirror to preserve phase coherence at the focus.

In an embodiment, the sensor 100 is a dual-mode imaging sensor in which passive light is collected from the inner ring and imaged onto the detector to form a focused passive image 125 and active light 140 (light reflected from the object) is collected from the outer ring and focused at outer ring focus 126 behind the imaging detector 102 to form a blurred-spot 128 such as in a semi-active laser (SAL) system 142. If the primary mirror is configured such that the FOV for the inner ring is focused at the detector, the different FOV for the outer ring is inherently focused at an imaging plane offset from the detector thus blurring the active light (absent correction taken by the MEMS MMA). The mirrors 132 may be tipped/tilted and possibly pistoned to further adjust the focus to provide the desired amount of blur. In different embodiments, the imaging detector may comprise a broadband detector that is sensitive to light that spans both the passive and active bands or a dual-band detector that is sensitive to and reads out the passive and active bands independently. D. F. King et. al., "Third-generation 1280× 720 FPA development status at Raytheon Vision Systems" Proc. SPIE 6206, Infrared Technology and Applications XXII, 62060 W (17 May 2006) discloses a suitable dual-band detector.

In a hybrid embodiment, the MEMS MMA is controlled to provide both dual-mode sensing and passive sensing in multiple FOV. For example, in a scenario the wide FOV 114 could be used initially to detect an object 104 (e.g., via a semi-active arrangement where the received active signal is blurred on the detector to provide directional information) and initiate track on the blurred-spot 128. The sensor could then switch to the narrow FOV 112 to passively image the object (image 125) to track and observe the object. As the object gets close, to avoid overfilling the detector, the sensor could switch to the wide FOV 114 and move the outer ring focus 126 to the detector to passively image the object (image 125) through terminal engagement.

Figure 3A:
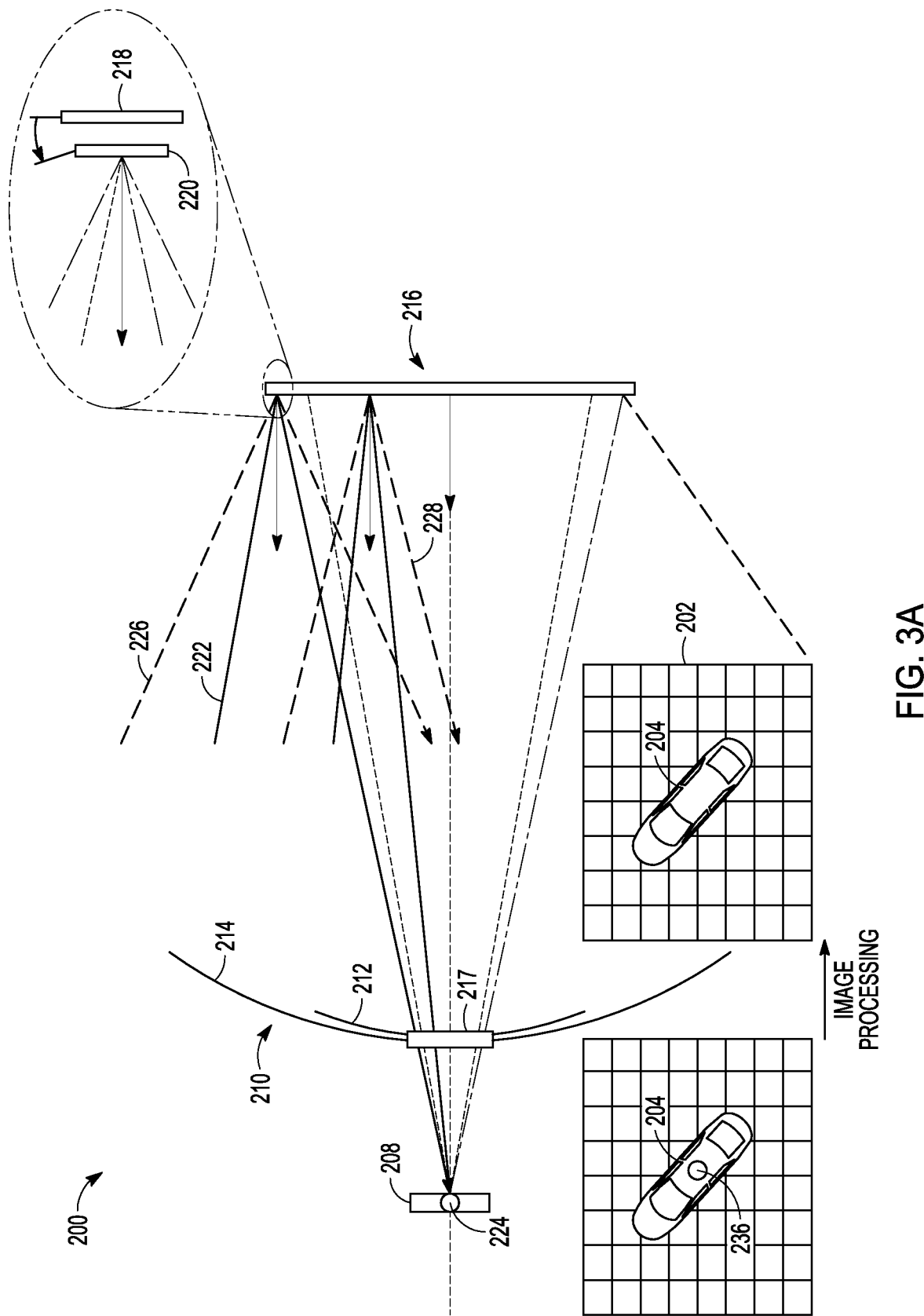
FIGS. 3A-3B are illustrations of an embodiment of a dual-mode sensor in which the MEMS MMA is configured to alternate between the first and second rings to alternately form a focused passive image of an object on the imaging detector and a blurred-spot on the imaging detector from light reflected off of the object.
Figure 3B:
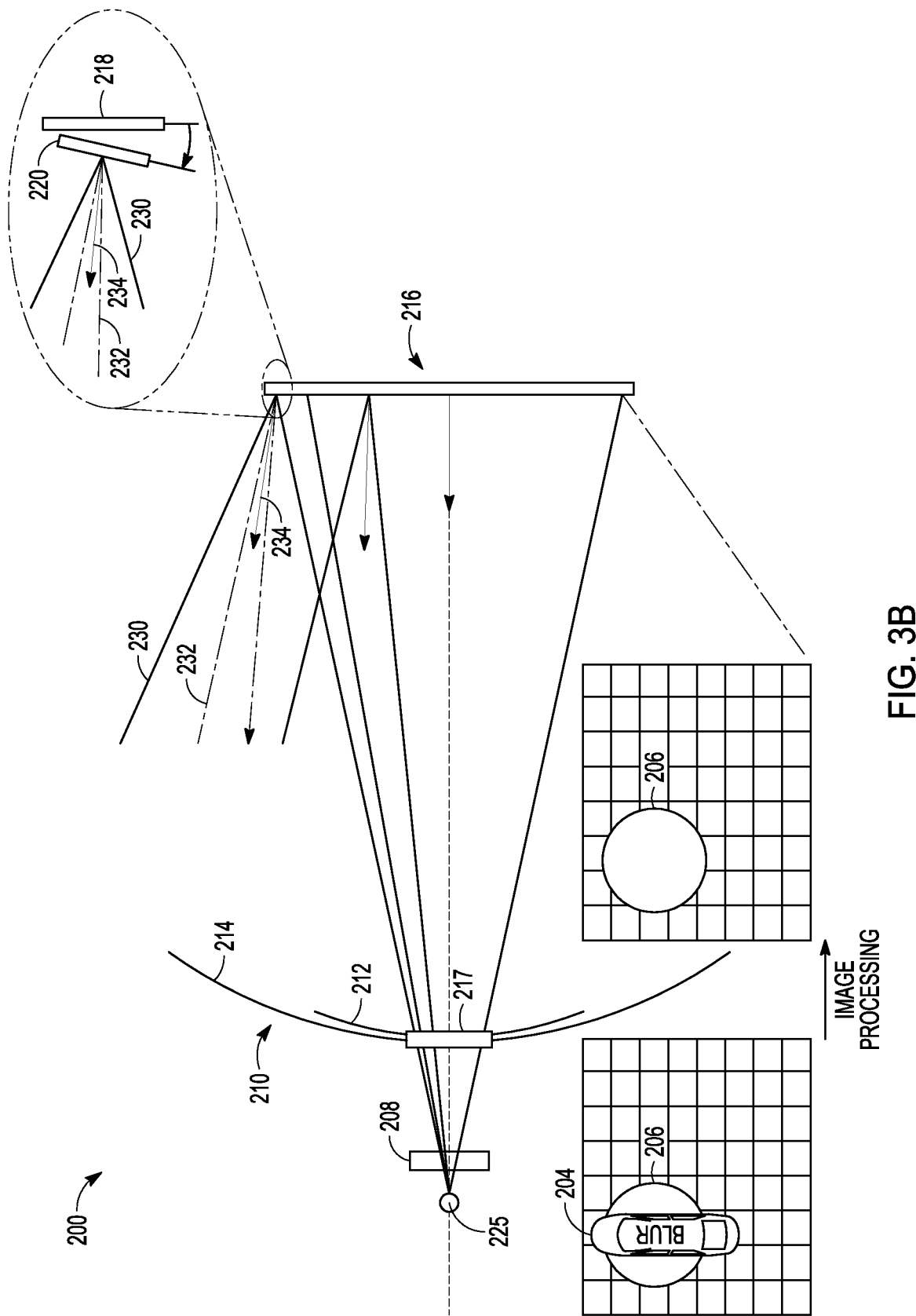
Figure 6:
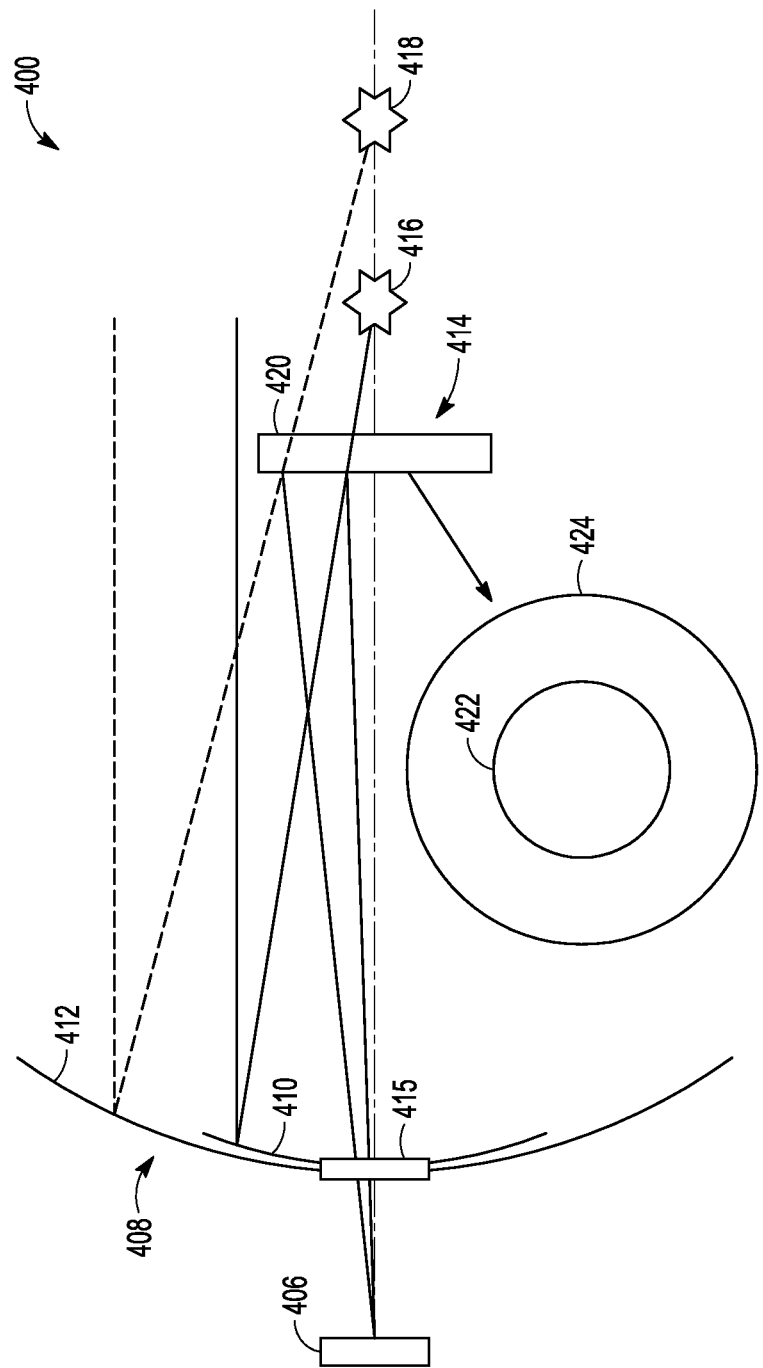
FIG. 6 is an illustration of an embodiment of a dual-mode sensor in which the MEMS MMA is configured to reflect light from the first and second FOV to non-overlapping portions of the imaging detector.

Referring now to FIGS. 3A-3B, a dual-mode multiple FOV optical sensor 200 is configured to alternate between capturing a focused passive image 202 of an object 204 in a narrow FOV and a blurred spot 206 of the object 204 in a wide FOV. Optical sensor 200 comprises an imaging detector 208 configured to sense light and readout an image, a primary mirror 210 including an inner ring 212 having a first curvature configured to collect light from an object within a narrow FOV and an outer ring 214 having a second curvature configured to collect light from the object within a wide FOV, and a secondary mirror 216 positioned in front of the primary mirror to reflect light through a central hole 217 in the primary mirror to the imaging detector positioned behind the primary mirror. The secondary mirror 216 comprises one or more MEMS MMA 218 each including a plurality of mirrors 220. MEMS MMA is responsive to command signals to tip and tilt the mirrors in two degrees-of-freedom (DOF), and possibly piston in 3 DOF, to alternately (I) reflect light 222 from the inner ring 212 within the narrow FOV that is focused to an imaging plane at a secondary inner ring focus 224 coincident with the imaging detector 208 to form the focused passive image 202 of the object at the imaging detector while reflecting light 226 from the outer ring 214 off of (away from) the imaging detector as stray light 228 and (II) reflect light 230 from the outer ring 214 within the wide FOV that is focused to an imaging plane at a secondary outer ring focus 225 that is offset from the imaging detector to form the blurred spot 206 on the imaging detector while reflecting light 232 from the inner ring 212 off of (away from) the imaging detector as stray light 234.

In the passive mode (I) as shown in FIG. 3A, both the object 204 and the SAL spot 236 are focused onto the detector. With a broadband detector that spans both the passive IR band and the designator wavelength, the sensor uses the SAL time gates to ignore the SAL and select frames that only include the focused passive image 202. With a dual-band sensor that is tuned to independently sense the passive IR band and the designator wavelength, the sensor just selects the passive IR band including the focused image 202.

In the active mode (II) as shown in FIG. 3B, both the object 204 and the SAL spot 206 are blurred on the detector. With a broadband detector that spans both the passive IR band and the designator wavelength, the sensor uses the SAL time gates to select frames that include the blurred spot 206. With a dual-band sensor that is tuned to independently sense the passive IR band and the designator wavelength, the sensor just selects the active band containing the blurred spot 206.

Referring now to FIGS. 4 and 5, a dual-mode multiple FOV optical sensor 300 is configured to simultaneously overlap both the narrow and wide FOV on an imaging detector 302. Optical sensor 300 comprises a primary mirror 304 including an inner ring 306 having a first curvature configured to collect light from an object within a narrow FOV and an outer ring 308 having a second curvature configured to collect light from the object within a wide FOV, and a secondary mirror 310 positioned in front of the primary mirror to reflect light through a central hole in the primary mirror to the imaging detector positioned behind the primary mirror. A primary outer ring focus 312 is closer to the primary mirror than a primary inner ring focus 314.

The secondary mirror 310 comprises one or more MEMS MMA 316 each including a plurality of mirrors 318. MEMS MMA is responsive to command signals to tip and tilt the mirrors in two degrees-of-freedom (DOF), and possibly piston in 3 DOF, to partition the mirrors into first and second segments 320 and 322, respectively. The segments may constitute contiguous arrangements of the mirrors such as in inner and outer rings or non-contiguous arrangement of the mirrors where the mirrors are interspersed such as in the depicted "checkerboard" pattern as shown here. The mirrors in first segment 320 are configured to reflect light from inner ring 306 within the narrow FOV and focus the light at image plane at a secondary inner ring focus 324 coincident with imaging detector 302. The mirrors in second segment 322 are configured to reflect light from outer ring 308 within the wide FOV and focus the light at image plane at a secondary outer ring focus 326 that is offset from the imaging detector 302 to blur the light at the detector.

As shown in FIG. 5, the focused and blurred light from the narrow and wide FOV overlap spatially and temporally at the imaging detector. The image 328 formed on the imaging detector includes a focused object 330 and a focused laser spot 332 within the narrow FOV and a blurred object 334 and a blurred laser spot 334 within the wide FOV. Given a dual-band imaging detector, the sensor may select the image of passive band 340 and process the imagery, for example, by using edge detection algorithms to extract the focused object 330. The sensor may select the image of active band 342 and SAL time gates to extract blurred laser spot 334 and focused laser spot 332.

Referring now to FIGS. 6 and 7A-7C, a dual-mode multiple FOV optical sensor 400 is configured to simultaneously project both the narrow and wide FOV onto non-overlapping portions 402 and 404 of an imaging detector 406. Optical sensor 400 comprises a primary mirror 408 including an inner ring 410 having a first curvature configured to collect light from an object within a wide FOV and an outer ring 412 having a second curvature configured to collect light from the object within a narrow FOV, and a secondary mirror 414 positioned in front of the primary mirror to reflect light through a central hole 415 in the primary mirror to the imaging detector positioned behind the primary mirror. In this configuration, the curvature of the inner ring is flattened with respect to the curvature of the outer ring such that a primary inner ring focus 416 is closer to the primary mirror than a primary outer ring focus 418.

The secondary mirror 414 comprises one or more MEMS MMA 420 each including a plurality of mirrors. MEMS MMA is responsive to command signals to tip and tilt the mirrors in two degrees-of-freedom (DOF), and possibly piston in 3 DOF, to partition the mirrors into first and second segments 422 and 424, respectively. The segments may constitute contiguous arrangements of the mirrors such as in inner and outer rings as shown here or non-contiguous arrangement of the mirrors where the mirrors are interspersed such as in the depicted "checkerboard" pattern. The mirrors in first segment 422 are configured to reflect light from inner ring 410 within the narrow FOV and focus the light at imaging detector 406 in portion 402. The mirrors in second segment 424 are configured to reflect light from outer ring 412 within the wide FOV and blur the light at the imaging detector 406 in portion 404. Both the narrow and wide FOV are simultaneously projected onto non-overlapping portions of the imaging detector.

Figure 7A:
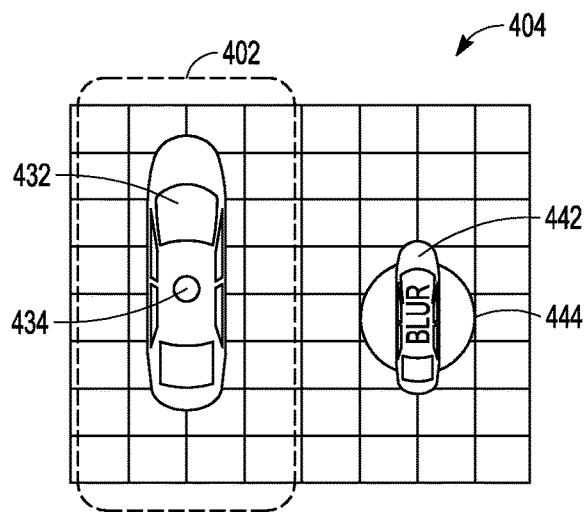
FIGS. 7A-7C are illustrations of an embodiment for using a dual-band detector to process the non-overlapped FOV to extract a focused image of an object and a location of the object.
Figure 7B:
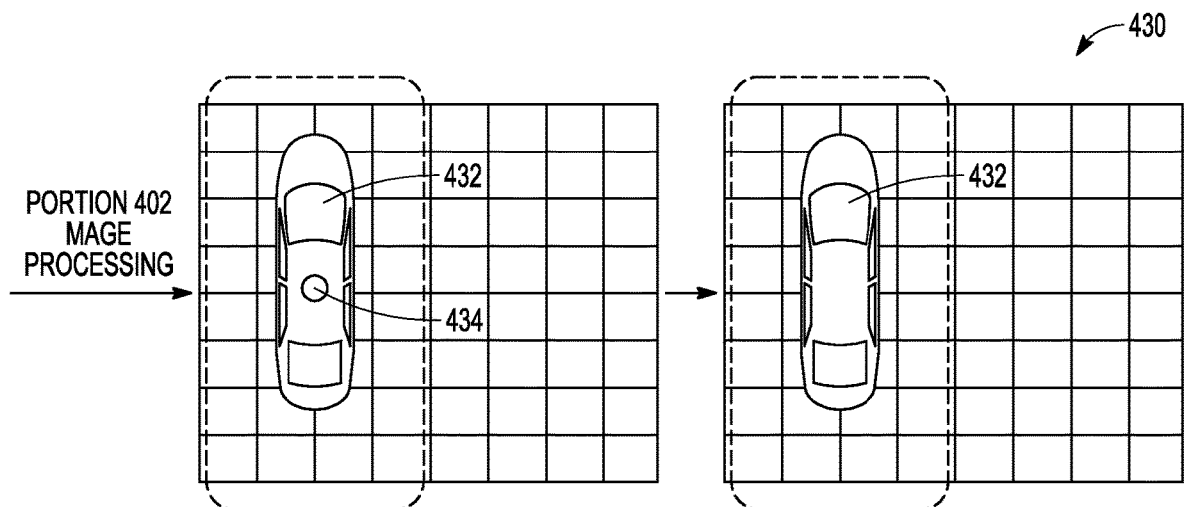
Figure 7C:
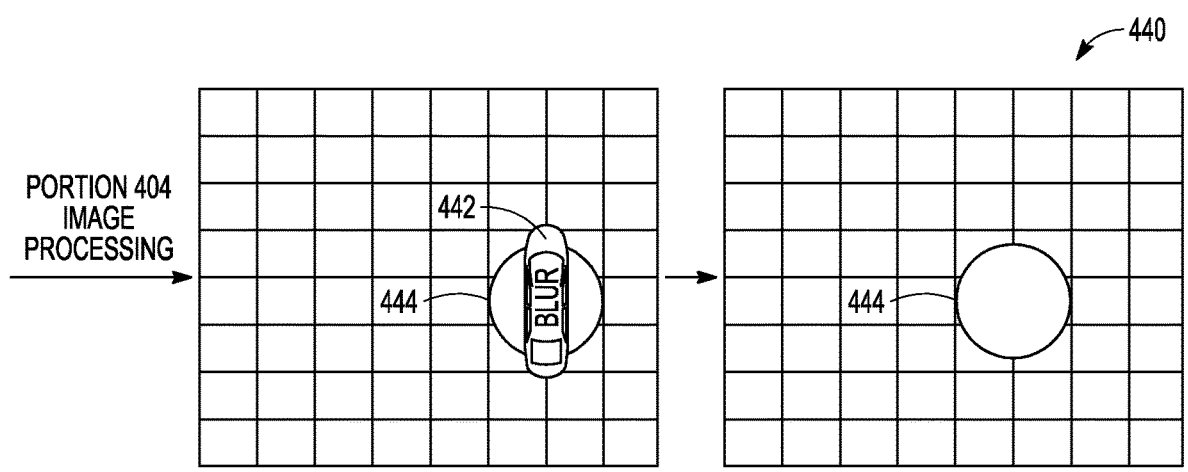

As shown in FIG. 7A, the focused and blurred light from the narrow and wide FOV are simultaneously projected onto non-overlapping portions 402 and 404 at the imaging detector. An image 430 corresponding to portion 402 includes a focused object 432 and a focused laser spot 434 within the narrow FOV. As shown in FIG. 7B, a dual-band imaging detector can select the passive band to extract an image of the focused object 432 while a broadband imaging detector can use the SAL time gates to select image frames that do not include the laser spot. An image 440 corresponding to portion 404 includes a blurred object 442 and a blurred laser spot 444 within the wide FOV. As shown in FIG. 7C, a dual-band imaging detector can select the active band to extract an image of the blurred object 442 while a broadband imaging detector can use the SAL time gates to select image frames that include the laser spot.

Figure 8A:
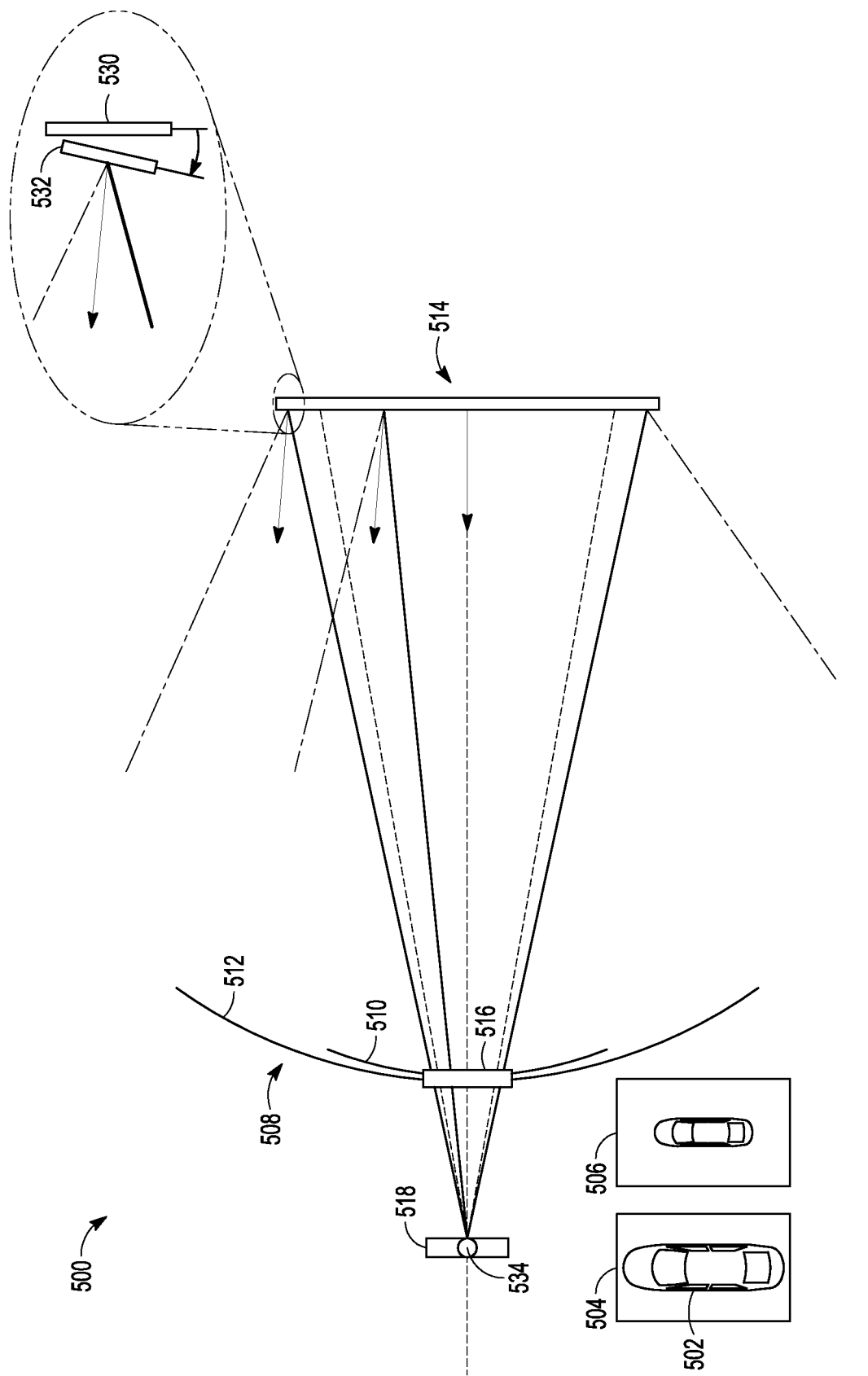
FIGS. 8A-8B are illustrations of embodiments of an all-passive sensor in which the MEMS MMA tips and tilts the mirrors to form a focused image on the image detector with loss of phase coherence and tips, tilts and pistons the mirrors to form the focused image on the image detector without loss of phase coherence, respectively.
Figure 8B:
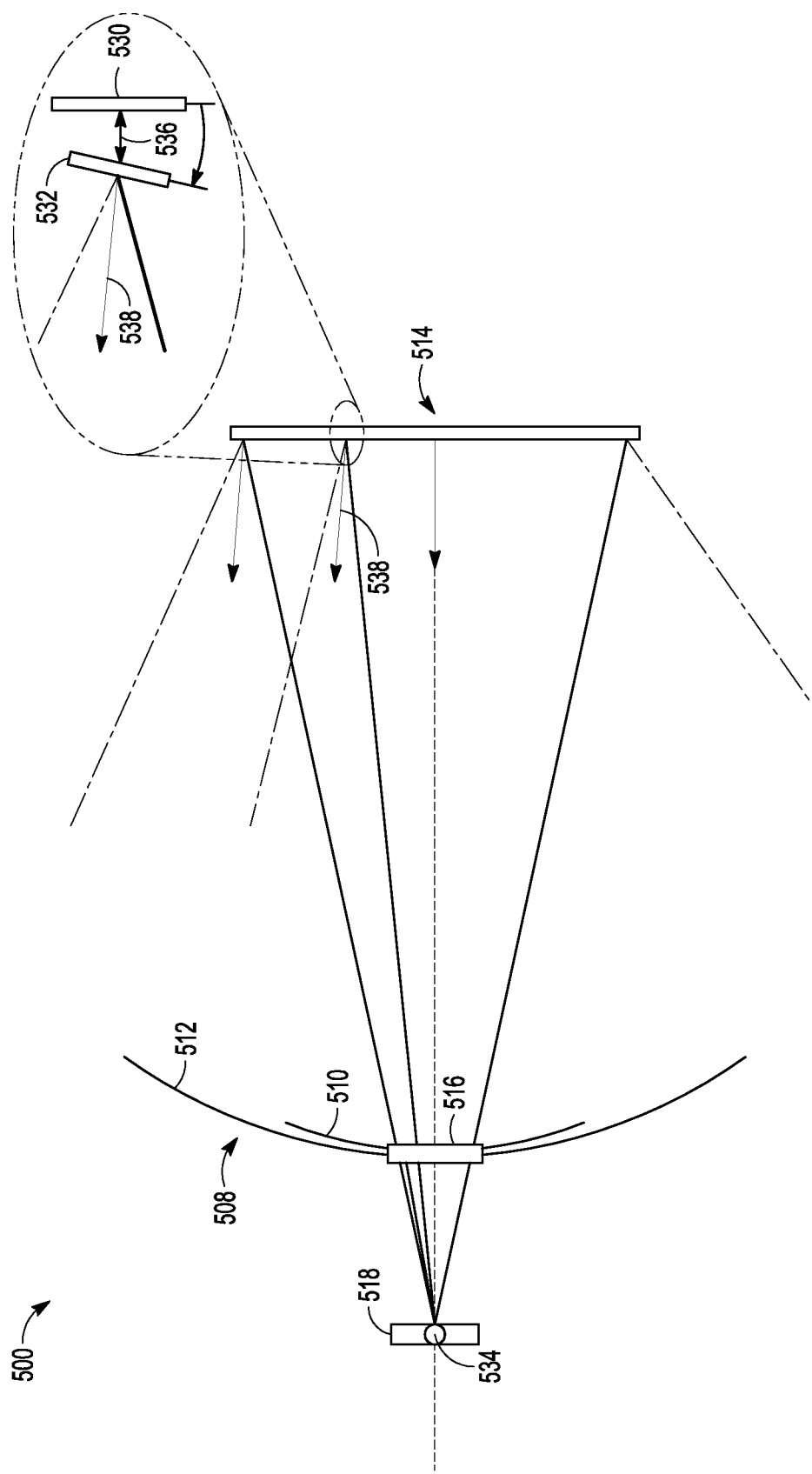

Referring now to FIGS. 8A-8B, an all-passive multiple FOV optical sensor 500 is configured to provide passive imaging of an object 502 in a scene at narrow and wide FOV 504 and 506, respectively. Optical sensor 500 comprises a primary mirror 508 including an inner ring 510 having a first curvature configured to collect light from the object within a narrow FOV 504 and an outer ring 512 having a second curvature configured to collect light from the object within a wide FOV 506, and a secondary mirror 514 positioned in front of the primary mirror to reflect light through a central hole 516 in the primary mirror to an imaging detector 518 positioned behind the primary mirror.

The secondary mirror 514 comprises one or more MEMS MMA 530 each including a plurality of mirrors 532. MEMS MMA is responsive to command signals to tip and tilt the mirrors in two degrees-of-freedom (DOF), and possibly piston in 3 DOF, to redirect light from the inner and outer rings to the imaging detector. The all-passive sensor and the MEMS MMA may be configured to alternate the FOV onto the imaging detector or to simultaneously project both FOV onto overlapping or non-overlapping portions of the imaging detector. The MEMS MMA is configured to collect light from the inner and outer rings and adjust the focus for each to form focused passive images of the object on the imaging detector at the narrow and wide different FOV. As shown in FIG. 8A, this may be accomplished by tipping and tilting the mirrors to move the focus 534 to the imaging plane at the detector, which results in a loss of phase coherence but still permits image formation on the detector. Alternately, as shown in FIG. 8B, the MEMS MMA may be configured to add piston 536, which can be used to further adjust the optical path length along each ray 538 at the center of each mirror 532 to preserve phase coherence at the focus 534.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A multiple field-of-view (FOV) optical sensor, comprising:
   an imaging detector configured to sense light and readout an image;
   a primary mirror including
      a first ring having a first curvature configured to collect light from an object within a first FOV; and
      a second ring having a second curvature configured to collect light from the object within a second FOV different than said first FOV;
   a secondary mirror comprising a Micro-Electro-Mechanical System (MEMS) Micro-Mirror Array (MMA) including a plurality of mirrors, said MEMS MMA responsive to command signals to tip and tilt the mirrors in two degrees-of-freedom (DOF) to (I) reflect light from the first ring within the first FOV that is focused to an imaging plane coincident with the imaging detector to form a focused image of the object at the imaging detector and (II) reflect light from the second ring within the second FOV of the object onto the imaging detector.

2. The multiple FOV optical sensor of claim 1, wherein without correction by the MEMS MMA in (II), light reflected from the second ring within the second FOV is focused to an imaging plane offset from the imaging detector to form a blurred spot of the object at the imaging detector.

3. The multiple FOV optical sensor of claim 2, wherein said MEMS MMA is responsive to additional command signals to tip and tilt the mirrors to adjust the offset of the imaging plane to control the blurred spot.

4. The multiple FOV optical sensor of claim 2, wherein passive light from the object is reflected from the first ring to form the focused image at the imaging detector and active light reflected from the object is reflected from the second ring to form the blurred spot at the imaging detector.

5. The multiple FOV optical sensor of claim 2, wherein said MEMS MMA is responsive to additional command signals to tip and tilt the mirrors to adjust the imaging plane to be coincident with the imaging detector to form a focused image of the object at the imaging detector for the second FOV.

6. The multiple FOV optical sensor of claim 5, wherein the mirrors tip, tilt and piston in 3 DOF, wherein said MEMS MMA is responsive to additional command signals to piston the mirrors to adjust the optical path length along each ray at the center of each mirror to preserve the phase coherence at the imaging plane coincident with the imaging detector.

7. The multiple FOV optical sensor of claim 1, wherein in (II) said MEMS MMA is responsive to additional command signals to tip and tilt the mirrors to adjust the imaging plane to be coincident with the imaging detector to form a focused image of the object at the imaging detector for the second FOV, wherein passive light from the object is reflected from the first and second rings to form the focused images of the object at the imaging detector in the different first and second FOV.

8. The multiple FOV optical sensor of claim 1, wherein the MEMS MMA is responsive to command signals to alternate between reflecting light from the first ring to the imaging detector and reflecting light from the second ring away from the imaging detector as stray light and reflecting light from the second ring to the imaging detector and reflecting light from the first ring away from the imaging detector as stray light.

9. The multiple FOV optical sensor of claim 8, wherein passive light in a first spectral band from the object is reflected from the first ring to form the focused image at the imaging detector in the first FOV and active light in a second spectral band reflected from the object is reflected from the second ring to form a blurred spot at the imaging detector within the second FOV.

10. The multiple FOV optical sensor of claim 9, wherein the imaging detector is configured to separately sense and readout images in the first and second spectral bands, respectively.

11. The multiple FOV optical sensor of claim 8, wherein passive light from the object is reflected from the first ring to form the focused image at the imaging detector in the first FOV, wherein said MEMS MMA is responsive to additional command signals to tip and tilt the mirrors to adjust the imaging plane to be coincident with the imaging detector to form a focused image of the object at the imaging detector for passive light in the second FOV.

12. The multiple FOV optical sensor of claim 1, wherein the MEMS MMA is responsive to command signals to simultaneously partition the mirrors into two segments such that light from both the first and second FOV overlap spatially at the imaging detector.

13. The multiple FOV optical sensor of claim 12, wherein passive light from the object is reflected from the first ring to form the focused image at the imaging detector and active light reflected from the object is reflected from the second ring to form a blurred spot at the imaging detector, wherein the imaging detector is configured to separately sense and readout images in the first and second spectral bands, respectively.

14. The multiple FOV optical sensor of claim 1, wherein the MEMS MMA is responsive to command signals to simultaneously partition the mirrors into two segments to reflect the light from the first and second rings to different non-overlapping portions of the imaging detector such that each read out image includes both the first and second FOV in the different non-overlapping portions of the image, respectively.

15. The multiple FOV optical sensor of claim 14, wherein passive light in a first spectral band from the object is reflected from the first ring to form the focused image at the imaging detector in the first FOV and active light in a second spectral band reflected from the object is reflected from the second ring to form a blurred spot at the imaging detector within the second FOV, wherein the imaging detector is configured to separately sense and readout images in the first and second spectral bands, respectively, to form the image including the focused image of the object in the first FOV in one portion of the image and the blurred spot of the object in the second FOV in the other portion of the image.

16. The multiple FOV optical sensor of claim 1, wherein the plurality of mirrors of the MEMS MMA approximate a base curvature to provide additional optical power to direct light reflected from the first or second rings to the imaging detector.

17. A multiple field-of-view (FOV) optical sensor, comprising:
an imaging detector configured to sense light and readout an image;
a primary mirror including
a first ring having a first curvature configured to collect passive light from an object within a first FOV; and
a second ring having a second curvature configured to collect active light reflected from the object within a second FOV different than said first FOV;
a secondary mirror comprising a Micro-Electro-Mechanical System (MEMS) Micro-Mirror Array (MMA) including a plurality of mirrors, said MEMS MMA responsive to command signals to tip and tilt the mirrors in two degrees-of-freedom (DOF) to alternate between (I) reflect passive light from the first ring within the first FOV that is focused to an imaging plane coincident with the imaging detector to form a focused image of the object at the imaging detector while reflecting light from the second ring away from the imaging detector as stray light and (II) reflect light from the second ring within the second FOV to form a blurred spot of the object at the imaging detector while reflecting light from the second ring away from the imaging detector as stray light.

18. The multiple FOV optical sensor of claim 17, wherein the mirrors tip, tilt and piston in 3 DOF, wherein said MEMS MMA is responsive to command signals to tip, tilt and piston the mirrors to alternate between forming the focused image from passive light and forming the blurred spot from active light.

19. A multiple field-of-view (FOV) optical sensor, comprising:
an imaging detector configured to sense light and readout an image;
a primary mirror including
an inner ring having a first curvature configured to collect passive light from an object within a first FOV; and
an outer ring having a second curvature configured to collect passive light from the object within a second FOV different than said first FOV;
a secondary mirror comprising a Micro-Electro-Mechanical System (MEMS) Micro-Mirror Array (MMA) including a plurality of mirrors, said MEMS MMA responsive to command signals to tip and tilt the mirrors in two degrees-of-freedom (DOF) to (I) reflect passive light from the inner ring within the first FOV that is focused to an imaging plane coincident with the imaging detector to form a focused image of the object at the imaging detector and (II) reflect light from the outer ring within the second FOV that is focused to an imaging plane coincident with the imaging detector to form a focused image of the object at the imaging detector, wherein said MEMS MMA is responsive to additional command signals to tip and tilt the mirrors to adjust the focus for
at least one of the inner and outer rings to form the focused image at the imaging detector.

20. The multiple FOV optical sensor of claim 19, wherein the mirrors tip, tilt and piston in 3 DOF, wherein said MEMS MMA is responsive to additional command signals to piston the mirrors to adjust the optical path length along each ray at the center of each mirror to preserve the phase coherence at the imaging plane coincident with the imaging detector.

* * * * *

UNITED STATES PATENT AND TRADEMARK OFFICE
CERTIFICATE OF CORRECTION

PATENT NO. : 12,130,384 B2
APPLICATION NO. : 17/217929
DATED : October 29, 2024
INVENTOR(S) : Dutton et al.

Page 1 of 1

It is certified that error appears in the above-identified patent and that said Letters Patent is hereby corrected as shown below:

In the Specification

In Column 6, Line 66, delete "104" and insert --106-- therefor

In Column 7, Line 50, delete "206" and insert --236-- therefor

In Column 8, Line 27, delete "334" and insert --336-- therefor

In Column 8, Line 32, delete "334" and insert --336-- therefor

In the Claims

In Column 9, Line 62, in Claim 1, after "including", insert --:--

In Column 11, Line 49, in Claim 17, after "including", insert --:--

In Column 12, Line 25, in Claim 19, after "including", insert --:--

In Column 12, Line 47, in Claim 19, after "for", delete a linebreak

Signed and Sealed this
Thirtieth Day of December, 2025

John A. Squires
*Director of the United States Patent and Trademark Office*